United States Patent
Dotson et al.

(10) Patent No.: US 11,814,504 B2
(45) Date of Patent: *Nov. 14, 2023

(54) POLYPROPYLENE POLYMER COMPOSITIONS AND ARTICLES MADE FROM THE SAME

(71) Applicant: Milliken & Company, Spartanburg, SC (US)

(72) Inventors: Darin Dotson, Moore, SC (US); Xiaoyou Xu, Spartanburg, SC (US); Hua Sun, Greenville, SC (US); Chi-Chun Tsai, Boiling Springs, SC (US); Corey Williams, Mauldin, SC (US)

(73) Assignee: Milliken & Company, Spartanburg, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/726,502

(22) Filed: Apr. 21, 2022

(65) Prior Publication Data

US 2022/0356327 A1    Nov. 10, 2022

Related U.S. Application Data

(60) Provisional application No. 63/178,238, filed on Apr. 22, 2021.

(51) Int. Cl.
 *C08K 5/5317*   (2006.01)
 *C08K 5/00*     (2006.01)

(52) U.S. Cl.
 CPC ........ *C08K 5/5317* (2013.01); *C08K 5/0083* (2013.01); *C08K 2201/006* (2013.01)

(58) Field of Classification Search
 CPC ........ C08K 5/5317; C08K 5/0083; C07F 9/38
 See application file for complete search history.

(56) References Cited

U.S. PATENT DOCUMENTS

| 4,972,011 | A  |   | 11/1990 | Richardson |
| 7,199,172 | B2 |   | 4/2007  | Rule |
| 9,018,413 | B2 | * | 4/2015  | Hill ............. C07F 9/4006 524/130 |
| 2012/0043692 | A1 |   | 2/2012  | Connor |

FOREIGN PATENT DOCUMENTS

| EP | 0245207   | A2 |   | 11/1987 |            |
| EP | 1739122   | A1 | * | 1/2007  | C08K 5/5317 |
| EP | 3214118   | A1 |   | 9/2017  |            |
| JP | 07258477  | A  | * | 10/1995 |            |
| WO | 2010126559| A1 |   | 11/2010 |            |
| WO | 2011106177| A1 |   | 9/2011  |            |
| WO | 2016014113| A1 |   | 1/2016  |            |

OTHER PUBLICATIONS

Google translation of JP 07258477 (1995, 8 pages).*
Google translation of EP 1739122 (2007, 15 pages).*
International Search Report and Written Opinion issued in App. No. PCT/US2022/025850, dated Jul. 19, 2022, 11 pages.
International Search Report and Written Opinion issued in App. No. PCT/US2022/025851, dated Jul. 26, 2022, 12 pages.
International Search Report and Written Opinion issued in App. No. PCT/US2022/025852, dated Jul. 19, 2022, 11 pages.
International Search Report and Written Opinion issued in App. No. PCT/US2022/025853, dated Jul. 11, 2022, 10 pages.

* cited by examiner

*Primary Examiner* — Brieann R Johnston
(74) *Attorney, Agent, or Firm* — Robert M. Lanning

(57) ABSTRACT

A polymer composition comprises a polypropylene polymer and a salt of a branched alkyl phosphonic acid.

20 Claims, No Drawings

POLYPROPYLENE POLYMER COMPOSITIONS AND ARTICLES MADE FROM THE SAME

CROSS-REFERENCE TO RELATED PATENT APPLICATIONS

This application claims, pursuant to 35 U.S.C. § 119(e), priority to and the benefit of the filing date of U.S. Patent Application No. 63/178,238, which was filed on Apr. 22, 2021, the contents of which are hereby incorporated by reference.

TECHNICAL FIELD OF THE INVENTION

This application relates to polymer compositions, such as polypropylene polymer compositions, containing a salt of a branched alkyl phosphonic acid. The salt of a branched alkyl phosphonic acid serves as a nucleating agent for the polymer.

BACKGROUND

Polyolefins are a group of polymer resins that are particularly versatile. Polyolefins are semicrystalline polymers. A polyolefin which has been allowed to cool relatively slowly (e.g., such as the cooling that takes place during the production of molded plastic parts) contains amorphous regions in which the polymer chains are randomly arranged and crystalline regions in which the polymer chains have assumed an orderly configuration. Within these crystalline regions of the polyolefin, the polymer chains align into domains commonly referred to as "crystalline lamellae." Under normal processing conditions, the crystalline lamellae grow radially in all directions as the polyolefin polymer cools from the molten state. This radial growth results in the formation of spherulites, which are spherical semicrystalline regions composed of multiple crystalline lamellae interrupted by amorphous regions. The size of the spherulites is affected by several parameters and can range from hundreds of nanometers to millimeters in diameter. When the spherulite size is appreciably larger than the wavelength of visible light, the spherulites will scatter visible light passing through the polymer. This scattering of visible light results in a hazy appearance which is commonly referred to as "polymer haze" or simply "haze." While appreciable levels of polymer haze may be acceptable in some applications, there are certain applications (e.g., storage containers) in which consumers desire relatively transparent plastics, which requires correspondingly low haze levels.

Several nucleating agents for thermoplastic polymers are known in the art. These nucleating agents generally function by forming nuclei or providing sites for the formation and/or growth of crystals in the thermoplastic polymer as it solidifies from a molten state. The nuclei or sites provided by the nucleating agent allow the crystals to form within the cooling polymer at a higher temperature and/or at a more rapid rate than the crystals will form in the virgin, non-nucleated thermoplastic polymer. These effects can then permit processing of a nucleated thermoplastic polymer composition at cycle times that are shorter than the virgin, non-nucleated thermoplastic polymer.

Some nucleating agents are able to reduce the spherulite size of certain polymers (e.g., polypropylene) to such an extent that the polymer haze is appreciably and noticeably reduced (i.e., the scattering of visible light passing though the polymer is reduced). Such nucleating agents are very beneficial because they enable the polymer to be used in applications where lower haze levels are required or at least desired. In addition to such improvements in optical properties, a desirable nucleating agent can improve other physical properties of the polymer, such as the stiffness or impact resistance. Such improvements again broaden the number of applications or end uses for which the nucleated polymer is suited. And while many nucleating agents can provide one of these physical property improvements, relatively few nucleating agents can provide a desirable combination of two or more physical property enhancements.

In view of the above, a need therefore remains for nucleating agents for thermoplastic polymers, such as polypropylene, that provide a desirable combination of, for example, low haze and high stiffness. The additives and polymer compositions described herein are intended to address such need.

BRIEF SUMMARY OF THE INVENTION

In a first embodiment, the invention provides a polymer composition comprising: (a) a polypropylene polymer; and (b) a salt of a branched alkyl phosphonic acid.

DETAILED DESCRIPTION OF THE INVENTION

In a first embodiment, the invention provides a polymer composition comprising: (a) a polypropylene polymer; and (b) a salt of a branched alkyl phosphonic acid.

The polymer composition can comprise any suitable polypropylene polymer. In a preferred embodiment, the polypropylene polymer is selected from the group consisting of polypropylene homopolymers (e.g., atactic polypropylene homopolymer, isotactic polypropylene homopolymer, and syndiotactic polypropylene homopolymer), polypropylene copolymers (e.g., polypropylene random copolymers), polypropylene impact copolymers, and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene), with ethylene being particularly preferred. In such polypropylene random copolymers, the comonomer can be present in any suitable amount, but typically is present in an amount of less than about 10 wt. % (e.g., about 0.5 wt. % to about 10 wt. %, or about 1 wt. % to about 7 wt. %). Suitable polypropylene impact copolymers include, but are not limited to, those produced by the addition of a copolymer selected from the group consisting of ethylene-propylene rubber (EPR), ethylenepropylene-diene monomer (EPDM), polyethylene, and plastomers to a polypropylene homopolymer or polypropylene random copolymer. In such polypropylene impact copolymers, the copolymer can be present in any suitable amount, but typically is present in an amount of from about 5 to about 25 wt. %. Suitable polypropylene impact copolymers also include, but are not limited to, copolymers made by the polymerization of propylene and ethylene using one or more Zeigler Natta catalysts. Such polypropylene impact copolymers generally have a heterophasic structure in which an amorphous ethylene-propylene copolymer is dispersed in a semi-crystalline polypropylene homopolymer or copolymer matrix. The polypropylene polymers described above can be branched or cross-linked, such as the branching or cross-linking that results from the addition of additives that increase the melt strength of the polymer.

As noted above, the polymer composition also comprises a salt of a branched alkyl phosphonic acid. As utilized herein, the term "branched alkyl phosphonic acid" refers to phosphonic acids of Formula (C) below

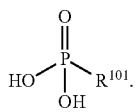   (C)

In Formula (C), $R^{101}$ is a branched alkyl group. The salt of the branched alkyl phosphonic acid can comprise any suitable cation(s). In a preferred embodiment, the salt of the branched alkyl phosphonic acid comprises one or more cations selected from the group consisting of Group 1 element cations, Group 2 element cations, and Group 12 element cations. In a preferred embodiment, the salt of the branched alkyl phosphonic acid comprises a Group 1 element cation, preferably two sodium cations. In another preferred embodiment, the salt of the branched alkyl phosphonic acid comprises a Group 2 element cation. In a particularly preferred embodiment, the salt of the branched alkyl phosphonic acid comprises a calcium cation.

The branched alkyl phosphonic acid can comprise any suitable branched alkyl group (i.e., $R^{101}$ can be any suitable branched alkyl group). In a preferred embodiment, the branched alkyl phosphonic acid comprises a branched alkyl group selected from the group consisting of isopropyl, sec-butyl, isobutyl, tert-butyl, tert-pentyl, neopentyl, isopentyl, sec-pentyl, sec-isopentyl, pentan-3-yl, and 2-methylbutyl. In another preferred embodiment, the branched alkyl phosphonic acid comprises an alkyl group with a branch point located at the alpha-carbon or beta-carbon relative to the phosphorus atom, with a branch point at the alpha-carbon being particularly preferred. In a preferred embodiment, the branched alkyl phosphonic acid comprises a tertiary alkyl group (i.e., an alkyl group comprising at least one carbon atom bonded to four non-hydrogen substituents, such as three alkyl groups and the phosphorus atom). In a preferred embodiment, the branched alkyl phosphonic acid comprises a branched alkyl group selected from the group consisting of tert-butyl, tert-pentyl, and neopentyl. In a particularly preferred embodiment, the branched alkyl phosphonic acid comprises a tert-butyl group (i.e., $R^{101}$ is tert-butyl). Thus, in a particularly preferred embodiment, the salt of the branched alkyl phosphonic acid is the calcium salt of tert-butylphosphonic acid (i.e., calcium t-butylphosphonate or calcium t-butylphosphonate monohydrate).

The salt of the branched alkyl phosphonic acid can have any suitable specific surface area (e.g., BET specific surface area). In a preferred embodiment, the salt of the branched alkyl phosphonic acid has a BET specific surface area of about 20 $m^2/g$ or more. In another preferred embodiment, the salt of the branched alkyl phosphonic acid has a BET specific surface area of about 30 $m^2/g$ or more. The BET specific surface area of the salt of the branched alkyl phosphonic acid can be measured by any suitable technique. Preferably, the BET specific surface area of the salt of the branched alkyl phosphonic acid is measured in accordance with ISO Standard 9277:2010, which is entitled "Determination of the Specific Surface Area of Solids by Gas Adsorption—BET method," using nitrogen as the adsorbing gas. The salts of branched alkyl phosphonic acids disclosed herein generally have a layered structure that can be exfoliated using techniques known in the art. Such exfoliation of the layered structure increases the BET specific surface area of the salt of the branched alkyl phosphonic acid, which aids in dispersion. Physical methods of increasing the BET surface area of the salt of the branched alkyl phosphonic acid include air jet milling, pin milling, hammer milling, grinding mills, and the like. Improved dispersion and surface area can also be achieved through more rigorous mixing and extrusion methods, such as high-intensity mixing and twin-screw extrusion. Thus, those salts of branched alkyl phosphonic acids that do not have the desired BET specific surface area can be exfoliated using these and other known techniques until the desired BET specific surface area is achieved.

The polymer composition can contain any suitable amount of the salt of the branched alkyl phosphonic acid. In a preferred embodiment, the salt of the branched alkyl phosphonic acid is present in the polymer composition in an amount of about 50 parts-per-million (ppm) or more, based on the total weight of the polymer composition. In another preferred embodiment, the salt of the branched alkyl phosphonic acid is present in the polymer composition in an amount of about 75 ppm or more, about 100 ppm or more, about 150 ppm or more, about 200 ppm or more, or about 250 ppm or more, based on the total weight of the polymer composition. The salt of the branched alkyl phosphonic acid preferably is present in the polymer composition in an amount of about 10,000 ppm or less, based on the total weight of the polymer composition. In a preferred embodiment, the salt of the branched alkyl phosphonic acid preferably is present in the polymer composition in an amount of about 5,000 ppm or less, about 4,000 ppm or less, about 3,000 ppm or less, about 2,000 ppm or less, about 1,500 ppm or less, about 1,250 ppm or less, or about 1,000 ppm or less, based on the total weight of the polymer composition. Thus, in a series of preferred embodiments, the salt of the branched alkyl phosphonic acid is present in the polymer composition in an amount of about 50 ppm to about 10,000 ppm (e.g., about 50 ppm to about 5,000 ppm, about 50 ppm to about 4,000 ppm, about 50 ppm to about 3,000 ppm, about 50 ppm to about 2,000 ppm, about 50 ppm to about 1,500 ppm, about 50 ppm to about 1,250 ppm, or about 50 ppm to about 1,000 ppm), about 75 ppm to about 10,000 ppm (e.g., about 75 ppm to about 5,000 ppm, about 75 ppm to about 4,000 ppm, about 75 ppm to about 3,000 ppm, about 75 ppm to about 2,000 ppm, about 75 ppm to about 1,500 ppm, about 75 ppm to about 1,250 ppm, or about 75 ppm to about 1,000 ppm), about 100 ppm to about 10,000 ppm (e.g., about 100 ppm to about 5,000 ppm, about 100 ppm to about 4,000 ppm, about 100 ppm to about 3,000 ppm, about 100 ppm to about 2,000 ppm, about 100 ppm to about 1,500 ppm, about 100 ppm to about 1,250 ppm, or about 100 ppm to about 1,000 ppm), about 150 ppm to about 10,000 ppm (e.g., about 150 ppm to about 5,000 ppm, about 150 ppm to about 4,000 ppm, about 150 ppm to about 3,000 ppm, about 150 ppm to about 2,000 ppm, about 150 ppm to about 1,500 ppm, about 150 ppm to about 1,250 ppm, or about 150 ppm to about 1,000 ppm), about 200 ppm to about 10,000 ppm (e.g., about 200 ppm to about 5,000 ppm, about 200 ppm to about 4,000 ppm, about 200 ppm to about 3,000 ppm, about 200 ppm to about 2,000 ppm, about 200 ppm to about 1,500 ppm, about 200 ppm to about 1,250 ppm, or about 200 ppm to about 1,000 ppm), about 250 ppm to about 10,000 ppm (e.g., about 250 ppm to about 5,000 ppm, about 250 ppm to about 4,000 ppm, about 250 ppm to about 3,000 ppm, about 250 ppm to about 2,000 ppm, about 250 ppm to about 1,500 ppm, about 250 ppm to about 1,250 ppm, or about 250 ppm to about 1,000 ppm), based on the total weight of the polymer composition. If the polymer composition comprises more than one salt of a branched alkyl phosphonic acid, each salt of a branched alkyl phosphonic acid can be present in the polymer composition in one of the amounts recited above, or the combined amount of all salts of branched alkyl phosphonic acids present in the polymer composition can fall within one of the ranges recited above. Preferably, when the polymer composition comprises more than one salt of a branched alkyl phosphonic acid, the combined amount of all salts of branched alkyl phosphonic acids present in the polymer composition falls within one of the ranges recited above.

The salts of branched alkyl phosphonic acids suitable for use in the compositions of the invention can be made by any suitable process. For example, the salts can be made by reacting in an aqueous medium the branched alkyl phosphonic acid and a metal base, such as a metal hydroxide (e.g., calcium hydroxide, sodium hydroxide, potassium hydroxide, magnesium hydroxide) or a metal oxide (e.g., calcium oxide or zinc oxide). The salts of branched alkyl phosphonic acids made by such a process can be hydrates (e.g., calcium t-butylphosphonate monohydrate). Such hydrate salts can be dehydrated by heating the salt to a sufficiently high temperature, but many of such dehydrated salts (e.g., calcium t-butylphosphonate) are sufficiently unstable that they rehydrate upon exposure to atmospheric moisture.

The polymer composition of the invention can contain other polymer additives in addition to the aforementioned salt(s) of the branched alkyl phosphonic acid(s). Suitable additional polymer additives include, but are not limited to, antioxidants (e.g., phenolic antioxidants, phosphite antioxidants, and combinations thereof), anti-blocking agents (e.g., amorphous silica and diatomaceous earth), pigments (e.g., organic pigments and inorganic pigments) and other colorants (e.g., dyes and polymeric colorants), fillers and reinforcing agents (e.g., glass, glass fibers, talc, calcium carbonate, and magnesium oxysulfate whiskers), nucleating agents, clarifying agents, acid scavengers (e.g., metal salts of fatty acids, such as the metal salts of stearic acid, and hydrotalcite-like materials), polymer processing additives (e.g., fluoropolymer polymer processing additives), polymer cross-linking agents, slip agents (e.g., fatty acid amide compounds derived from the reaction between a fatty acid and ammonia or an amine-containing compound), fatty acid ester compounds (e.g., fatty acid ester compounds derived from the reaction between a fatty acid and a hydroxyl-containing compound, such as glycerol, diglycerol, and combinations thereof), polymer modifiers (e.g., hydrocarbon resin modifiers such as those sold under the Oppera™ tradename by Exxon Mobil Corporation), and combinations of the foregoing.

In a preferred embodiment, the polymer composition further comprises one or more acid scavengers. As noted above, suitable acid scavengers include metal salts of fatty acids and hydrotalcite-like materials (e.g., synthetic hydrotalcites). Suitable metal salts of fatty acids include, but are not limited to, the metal salts of $C_{12}$-$C_{22}$ fatty acids (e.g., saturated $C_{12}$-$C_{22}$ fatty acids), such as stearic acid. In a preferred embodiment, the acid scavenger is selected from the group consisting of the calcium, zinc, potassium, and lanthanum salts of stearic acid, with zinc stearate being particularly preferred. Hydrotalcite-like materials suitable for use as acid scavengers include, but are not limited to, the synthetic hydrotalcite materials (CAS No. 11097-59-9) sold by Kisuma Chemicals under the "DHT-4A" and "DHT-4V" tradenames.

The salt(s) of the branched alkyl phosphonic acid(s) and the acid scavenger can be present in the polymer composition in any suitable relative amounts. For example, the salt(s) of the branched alkyl phosphonic acid(s) and the acid scavenger can be present in the polymer composition in a ratio (salt(s) of the branched alkyl phosphonic acid(s) to acid scavenger) of about 10:1 to about 1:10 based on the weight of the salt(s) of the branched alkyl phosphonic acid(s) and the acid scavenger in the polymer composition. More preferably, the salt(s) of the branched alkyl phosphonic acid(s) and the acid scavenger are present in the polymer composition in a ratio (salt(s) of the branched alkyl phosphonic acid(s) to acid scavenger) of about 4:1 to about 1:4, about 3:1 to about 1:3 (e.g., about 3:1 to about 1:1 or about 3:1 to about 2:1), about 1:1 to about 1:4, or about 1:1 to about 1:3 based on the weight of the salt(s) of the branched alkyl phosphonic acid(s) and the acid scavenger in the polymer composition. In a particularly preferred embodiment, the salt(s) of the branched alkyl phosphonic acid(s) and the acid scavenger are present in the polymer composition in a ratio of about 2:1 based on the weight of the salt(s) of the branched alkyl phosphonic acid(s) and the acid scavenger in the polymer composition (e.g., about 2 parts by weight calcium t-butylphosphonate monohydrate to 1 part by weight zinc stearate). In another particularly preferred embodiment, the salt(s) of the branched alkyl phosphonic acid(s) and the acid scavenger are present in the polymer composition in a ratio of about 3:1 based on the weight of the salt(s) of the branched alkyl phosphonic acid(s) and the acid scavenger in the polymer composition (e.g., about 3 parts by weight calcium t-butylphosphonate monohydrate to 1 part by weight zinc stearate).

As noted above, the polymer composition of the invention can contain other nucleating agents in addition to the salt(s) of the branched alkyl phosphonic acid(s) described above. Suitable nucleating agents include, but are not limited to, 2,2'-methylene-bis-(4,6-di-tert-butylphenyl) phosphate salts (e.g., sodium 2,2'-methylene-bis-(4,6-di-tert-butylphenyl) phosphate or hydroxyaluminum bis(2,2'-methylene-bis-(4,6-di-tert-butylphenyl)phosphate), bicyclo[2.2.1]heptane-2,3-dicarboxylate salts (e.g., disodium bicyclo[2.2.1]heptane-2,3-dicarboxylate or calcium bicyclo[2.2.1]heptane-2,3-dicarboxylate), cyclohexane-1,2-dicarboxylate salts (e.g., calcium cyclohexane-1,2-dicarboxylate, monobasic aluminum cyclohexane-1,2-dicarboxylate, dilithium cyclohexane-1,2-dicarboxylate, or strontium cyclohexane-1,2-dicarboxylate), glycerolate salts (e.g., zinc glycerolate), phthalate salts (e.g., calcium phthalate), phenylphosphonic acid salts (e.g., calcium phenylphosphonate), and combinations thereof. For the bicyclo[2.2.1]heptane-2,3-dicarboxylate salts and the cyclohexane-1,2-dicarboxylate salts, the carboxylate moieties can be arranged in either the cis- or trans-configuration, with the cis-configuration being preferred.

As noted above, the polymer composition of the invention can also contain a clarifying agent. Suitable clarifying agents include, but are not limited to, trisamides and acetal compounds that are the condensation product of a polyhydric alcohol and an aromatic aldehyde. Suitable trisamide clarifying agents include, but are not limited to, amide derivatives of benzene-1,3,5-tricarboxylic acid, derivatives of N-(3,5-bis-formylamino-phenyl)-formamide (e.g., N-[3,5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof. As noted above, the clarifying agent can be an acetal compound that is the condensation product of a polyhydric alcohol and an aromatic aldehyde. Suitable polyhydric alcohols include acyclic polyols such as xylitol and sorbitol, as well as acyclic deoxy polyols (e.g., 1,2,3-trideoxynonitol or 1,2,3-trideoxynon-1-enitol). Suitable aromatic aldehydes typically contain a single aldehyde group with the remaining positions on the aromatic ring being either unsubstituted or substituted. Accordingly, suitable aromatic aldehydes include benzaldehyde and substituted benzaldehydes (e.g., 3,4-dimethyl-benzaldehyde or 4-propyl-benzaldehyde). The acetal compound produced by the aforementioned reaction can be a mono-acetal, di-acetal, or tri-acetal compound (i.e., a compound containing one, two, or three acetal groups, respectively), with the di-acetal compounds being preferred. Suitable acetal-based clarifying agents include, but are not limited to, the clarifying agents disclosed in U.S. Pat. Nos. 5,049,605; 7,157,510; and 7,262,236.

The polymer composition of the invention can be produced by any suitable method or process. For example, the polymer composition can be produced by simple mixing of the individual components of the polymer composition (e.g., polymer, salt(s) of branched alkyl phosphonic acid(s), and other additives, if any). The polymer composition can also be produced by mixing the individual components under high shear or high intensity mixing conditions. The polymer composition of the invention can be provided in any form suitable for use in further processing to produce an article of manufacture from the thermoplastic polymer composition. For example, the thermoplastic polymer compositions can be provided in the form of a powder (e.g., free-flowing powder), flake, pellet, prill, tablet, agglomerate, and the like.

The polymer composition of the first embodiment invention can take the form of a masterbatch composition designed for addition or let-down into a virgin polymer (e.g., an unnucleated polypropylene polymer). In such an embodiment, the polymer composition will generally contain a higher amount of the salt of the branched alkyl phosphonic acid as compared to a thermoplastic polymer composition intended for use in the formation of an article of manufacture without further dilution or addition to a virgin thermoplastic polymer For example, the salt of the branched alkyl phosphonic acid can be present in such a polymer composition in an amount of about 0.5 wt. % or more (e.g., about 1 wt. % or more or about 2 wt. % or more). The maximum amount of the salt in the masterbatch is only limited by manufacturing and processing considerations, though the amount would typically be about 50 wt. % or less. Thus, in a series of preferred embodiments, the salt of the branched alkyl phosphonic acid can be present in the masterbatch in an amount of about 0.5 wt. % to about 50 wt. % (e.g., about 0.5 wt. % to about 40 wt. %, about 0.5 wt. % to about 30 wt. %, about 0.5 wt. % to about 25 wt. %, about 0.5 wt. % to about 20 wt. %, about 0.5 wt. % to about 15 wt. %, about 0.5 wt. % to about 10 wt. %, about 0.5 wt. % to about 5 wt. %, or about 0.5 wt. % to about 4 wt. %), about 1 wt. % to about 50 wt. % (e.g., about 1 wt. % to about 40 wt. %, about 1 wt. % to about 30 wt. %, about 1 wt. % to about 25 wt. %, about 1 wt. % to about 20 wt. %, about 1 wt. % to about 15 wt. %, about 1 wt. % to about 10 wt. %, about 1 wt. % to about 5 wt. %, or about 1 wt. % to about 4 wt. %), or about 2 wt. % to about 50 wt. % (e.g., about 2 wt. % to about 40 wt. %, about 2 wt. % to about 30 wt. %, about 2 wt. % to about 25 wt. %, about 2 wt. % to about 20 wt. %, about 2 wt. % to about 15 wt. %, about 2 wt. % to about 10 wt. %, about 2 wt. % to about 5 wt. %, or about 2 wt. % to about 4 wt. %), based on the total weight of the polymer composition. In such a masterbatch composition, any additional additives contained in the composition will likewise be present in higher amounts that are intended to deliver the desired concentration when the masterbatch composition is let-down in the virgin polymer.

The polymer composition of the invention is believed to be useful in producing thermoplastic polymer articles of manufacture. The polymer composition of the invention can be formed into a desired thermoplastic polymer article of manufacture by any suitable technique, such as injection molding (e.g., thin-wall injection molding, multicomponent molding, overmolding, or 2K molding), blow molding (e.g., extrusion blow molding, injection blow molding, or injection stretch blow molding), extrusion (e.g., fiber extrusion, tape (e.g., slit tape) extrusion, sheet extrusion, film extrusion, cast film extrusion, pipe extrusion, extrusion coating, or foam extrusion), thermoforming, rotomolding, film blowing (blown film), film casting (cast film), compression molding, extrusion compression molding, extrusion compression blow molding, and the like. Thermoplastic polymer articles made using the polymer composition of the invention can be comprised of multiple layers (e.g., multilayer blown or cast films or multilayer injection molded articles), with one or any suitable number of the multiple layers containing a polymer composition of the invention.

The polymer composition of the invention can be used to produce any suitable article of manufacture. Suitable articles of manufacture include, but are not limited to, medical devices (e.g., pre-filled syringes for retort applications, intravenous supply containers, and blood collection apparatus), food packaging, liquid containers (e.g., containers for drinks, medications, personal care compositions, shampoos, and the like), apparel cases, microwavable articles, shelving, cabinet doors, mechanical parts, automobile parts, sheets, pipes, tubes, rotationally molded parts, blow molded parts, films, fibers, and the like.

The following examples further illustrate the subject matter described above but, of course, should not be construed as in any way limiting the scope thereof.

EXAMPLE 1

This example demonstrates the production of polymer compositions according to the invention and certain physical properties of thin-wall injection molded parts made with such polymer compositions.

Several polymer compositions were made using different commercially available polypropylene resins. The samples labeled "1A" were made with Pro-fax 6301 polypropylene homopolymer from LyondellBasell, which is reported to have a melt flow rate of 12 g/10 min. The samples labeled "1B" were made with HPP SF-40 from Lanzhou, which is reported to have a melt flow rate of 60 g/10 min. The samples labeled "1C" were made with HPP Q/SH3210 from Luoyang, which is reported to have a melt flow rate of 80 g/10 min. The samples labeled "1D" were made with PPH-M70 from Sinopec Tianjin, which is reported to have melt flow rate of 70 g/10 min. All of the samples were stabilized with 500 ppm of Irganox® 1010 antioxidant and 1,000 ppm of Irgafos® 168 antioxidant, both of which are available from BASF. Some polymer compositions further included calcium t-butylphosphonate monohydrate ("CaTBP"), zinc stearate ("ZnSt"), and the acid scavengers calcium sterate ("CaSt"), and/or DHT-4V from Kisuma Chemicals. The amounts of these additional components are noted in the tables that follow.

Each of the polymer compositions was prepared by high intensity mixing of the polypropylene resin and additives and then melt compounding the mixture using a Deltaplast single screw extruder. The screw speed of the extruder was set at 126 rpm. The first zone of the extruder barrel was set at 200° C., the second zone of the extruder barrel was set at 215° C., and the third through sixth zones of the extruder barrel were all set at 230° C. After melt compounding, each extrudate was cut into pellets for subsequent processing.

The extruded pellets of each polymer composition were then injection molded into 16 U.S. fluid ounce (470 mL) deli cups on a Husky injection molding machine with all barrels set at 220° C., an injection rate of 140 mm/s, a back pressure of 50 psi (0.14 MPa), and the mold cooling water set at 45° C. The deli cups had a circular base measuring 3.637 inches (92.38 mm) in diameter, a circular open at the top having a rim measuring 4.266 inches (108.4 mm) in diameter at the inner edge of the rim and 4.612 inches (117.1 mm) in diameter at the outer edge of the rim. The deli cups had a wall thickness of 26 mil (0.66 mm).

After molding, the deli cups were then tested to determine several physical properties. The compression top load was measured in accordance with ASTM D2659. The haze was measured in accordance with ASTM D1003. The crystallization behavior, specifically the crystallization half-time ($T_{1/2}$) and crystallization temperature ($T_c$), were measured using differential scanning calorimetry. The crystallization half-time was measured at 140° C., and the crystallization temperature was measured at a heating rate of 20° C./min. The results of these measurements are reported in Tables 1-4 below.

TABLE 1

Additive concentrations for Samples 1A-1 to 1A-5 and physical properties of deli cups made from Samples 1A-1 to 1A-5.

| Sample | CaTBP (ppm) | ZnSt (ppm) | Acid Scavenger | $T_{1/2}$ (mins) | $T_c$ (° C.) | Top Load (N) | Haze (%) |
|---|---|---|---|---|---|---|---|
| 1A-1 | — | — | 600 ppm CaSt | >30 | 114 | 1119.35 | 33.2 |
| 1A-2 | 350 | 150 | 300 ppm DHT-4V | 5.78 | 123 | 1254.97 | 14.2 |
| 1A-3 | 350 | 150 | 600 ppm CaSt | 8.49 | 121 | 1254.79 | 22.8 |
| 1A-4 | 700 | 300 | 300 ppm DHT-4V | 3.54 | 125 | 1287.99 | 13.3 |
| 1A-5 | 700 | 300 | 600 ppm CaSt | 5.04 | 123 | 1273.99 | 19.2 |

TABLE 2

Additive concentrations for Samples 1B-1 to 1B-5 and physical properties of deli cups made from Samples 1B-1 to 1 B-5.

| Sample | CaTBP (ppm) | ZnSt (ppm) | Acid Scavenger | $T_{1/2}$ (mins) | $T_c$ (° C.) | Top Load (N) | Haze (%) |
|---|---|---|---|---|---|---|---|
| 1B-1 | — | — | 600 ppm CaSt | 14.48 | 119 | 1187.37 | 45.5 |
| 1B-2 | 350 | 150 | 300 ppm DHT-4V | 2.39 | 129 | 1425.11 | 22 |
| 1B-3 | 350 | 150 | 600 ppm CaSt | 7.84 | 124 | — | 36.9 |
| 1B-4 | 700 | 300 | 300 ppm DHT-4V | 1.99 | 128 | 1586.01 | 19.1 |
| 1B-5 | 700 | 300 | 600 ppm CaSt | 4.98 | 125 | 1506.15 | 31.9 |

TABLE 3

Additive concentrations for Samples 1C-1 to 1C-5 and physical properties of deli cups made from Samples 1C-1 to 1C-5.

| Sample | CaTBP (ppm) | ZnSt (ppm) | Acid Scavenger | $T_{1/2}$ (mins) | $T_c$ (° C.) | Top Load (N) | Haze (%) |
|---|---|---|---|---|---|---|---|
| 1C-1 | — | — | 600 ppm CaSt | 11.36 | 123 | 1362.54 | 58.8 |
| 1C-2 | 350 | 150 | 300 ppm DHT-4V | 2.23 | 127 | 1533.3 | 23.4 |
| 1C-3 | 350 | 150 | 600 ppm CaSt | 4.92 | 125 | 1485.28 | 37.8 |
| 1C-4 | 700 | 300 | 300 ppm DHT-4V | 1.53 | 128 | 1543.61 | 22 |
| 1C-5 | 700 | 300 | 600 ppm CaSt | 2.55 | 126 | 1573.83 | 33.3 |

TABLE 4

Additive concentrations for Samples 1D-1 to 1D-5 and physical properties of deli cups made from Samples 1D-1 to 1 D-5.

| Sample | CaTBP (ppm) | ZnSt (ppm) | Acid Scavenger | $T_{1/2}$ (mins) | $T_c$ (° C.) | Top Load (N) | Haze (%) |
|---|---|---|---|---|---|---|---|
| 1D-1 | — | — | 600 ppm CaSt | 9.15 | 121 | 1220.31 | 46.2 |
| 1D-2 | 350 | 150 | 300 ppm DHT-4V | 4.53 | 126 | 1640.02 | 21.1 |
| 1D-3 | 350 | 150 | 600 ppm CaSt | 5.65 | 124 | 1515.18 | 33.1 |
| 1D-4 | 700 | 300 | 300 ppm DHT-4V | 2.85 | 128 | 1613.06 | 18.3 |
| 1D-5 | 700 | 300 | 600 ppm CaSt | 4.89 | 125 | 1535.5 | 28.4 |

As can be seen from the data in Tables 1-4 above, the calcium t-butylphosphonate monohydrate ("CaTBP") was effective at nucleating all of the polypropylene polymers. These nucleation effects are apparent from the shorter crystallization half-times, the higher crystallization temperatures, the higher compression top loads, and the lower haze values exhibited by all of the polymer compositions containing CaTBP as compared to their respective control polymers (i.e., the polypropylene resin without the CaTBP). Further, these results demonstrate that the polymer compositions containing a synthetic hydrotalcite acid scavenger (e.g., DHT-4V) exhibited slightly better nucleation relative to the polymer compositions containing calcium stearate as the acid scavenger. Again, this better nucleation is evident from the shorter crystallization half-times, the higher crystallization temperatures, the higher compression top loads, and the lower haze values exhibited by the polymer compositions containing DHT-4V as compared to those polymer compositions containing calcium stearate.

EXAMPLE 2

This example demonstrates the production of polymer compositions according to the invention and certain physical properties of thermoformed articles made with such polymer compositions.

Polymer compositions were made using Polypropylene 3371 resin from TotalEnergies, which has a reported melt flow rate of 2.8 g/10 min. Certain polymer compositions were nucleated with calcium t-butylphosphonate monohydrate ("CaTBP"), which was used in conjunction with an acid scavenger, such as zinc stearate ("ZnSt") and calcium stearate ("CaSt"). The amount of CaTBP and acid scavenger used in each polymer composition is noted in the tables below. The 3371 resin and additives were high intensity mixed using a Henschel mixer prior to melt compounding as described below.

The polymer composition was melt compounded on a Werner & Pfleiderer zsk-40 twin screw extruder having a screw diameter of 40 mm and an L/D ration of 37. The temperature of the first zone of the extruder barrel was set at 165° C., the temperature of the second through sixth zones of the extruder barrel and the die zone were set at 175° C. The extruder speed was set at 400 rpm, and the total output was approximately 55 kg/hr. The polymer strands exiting the extruder die were cooled in a water bath and then cut into pellets using a pelletizer.

The pelletized polymer compositions were then thermoformed into drink cups using a type A-T-20-G1 sheet line from Reifenhäuser coupled with a RDM 54K thermoformer from iLLig. The sheet line's extruder was set at 230° C., and the die zone was set at 250° C. with a die gap of 1.5 mm. The screw rate was approximately 72 rpm. The sheet exiting the die was then transferred onto a set of three stacked chill rolls set at 65° C., 75° C., and 65° C. The sheet exiting the chill rolls had a thickness of 1.9 mm. The sheet was then indexed through the heating section of the thermoformer, which was set at 165° C., to heat the sheet just below the melt temperature of the polymer composition. The sheet was then advanced to the molding section where it was thermoformed into drink cups that were then trimmed from the sheet and ejected from the thermoformer. The resulting drink cups had a base diameter of approximately 60 mm, a top rim diameter of approximately 94 mm, and a height of approximately 140 mm.

Specimens of the extruded sheet and thermoformed drink cups were taken for optical property and physical property testing as described below. Haze and clarity were measured pursuant to ASTM D1003 using a BYK haze-gard haze meter. For the thermoformed drink cups, the haze measurements were taken in an area that was 76.2 mm from the cup base and 25.4 mm from the top rim. Gloss was measured using a BYK single angle gloss meter, micro-gloss 20°. Measurements were taken from both sides of the specimen and the results averaged to obtain an average gloss reported in gloss units.

Thermal properties of the specimens were measured by differential scanning calorimetry using a Mettler Toledo differential scanning calorimeter (DSC) unit (DSC 3+ STAR system) and analyzed by Mettler STARe evaluation software. For crystallization temperature measurements, specimens were heated up from 50° C. to 220° C. at a rate of 20° C./min to remove all the thermal history. After holding the specimen at 220° C. for 2 minutes to equilibrate, the specimen was cooled to 50° C. at a rate of 20° C./min to examine the crystallization behavior. Crystallization temperature ($T_c$) is reported as the peak value on the cooling curve. For the crystallization half-time measurements, the specimen was heated from 50° C. to 220° C. at a rate of 20° C./min to remove all the thermal history, held at 220° C. for 2 minutes to equilibrate, and then cooled to 135° C. at a rate of 300° C./min and held at that temperature for 30 minutes. The crystallization half-time was calculated from the DSC curve using the software.

Specimens for flexural modulus testing were cut from the extruded sheet using a Type 1 dog-bone cutting die described in ASTM D638-10. Specimens for testing were taken from the machine direction and transverse direction. The specimens were then condition for at least 40 hours at approximately 23° C. and approximately 50% relative humidity. Flexural modulus testing was then performed in accordance with ASTM D790-10 using a Criterion Model 43 electromechanical test system from MTS equipped with a three-point bend flexure set-up (Model 642.01A). The depth of beam movement was recorded to calculate strain. The 1% Secant modulus was calculated based on the ratio of stress and strain when strain reaches 1%.

The cup ovality is a parameter indicating the difference in the cup diameter measured in the machine direction (parallel to the direction the sheet exited the die) and transverse direction (transverse to the direction the sheet exited the die). The thermoformed cups were conditioned at least 24 hours before measurement (in inches) of the outer rim diameter in the machine direction ($D_{MD}$) and the transverse direction ($D_{TD}$) using a caliper. The cup ovality, which was reported in mils, was calculated using the following equation:

$$\text{Cup ovality}=(D_{MD}-D_{TD})\times 1000$$

Rim shrinkage is a parameter indicating the difference between the diameter of the rim of the thermoformed cup and the diameter of the corresponding part of the mold from which the cup was made. The diameter of the mold was 3.7427 inches. The average diameter of the cup rim ($D_{avg}$) was measured (in inches) using a spring tension band. Rim shrinkage of the cup, which was reported in mils, was calculated using the following equation $$\text{Rim shrinkage}=(3.7427-D_{avg})\times 1000.$$

The compressive strength of the thermoformed cup's side wall was measured using a probe to determine the force of resistance to deflection. A cup was positioned horizontally on its side using a cup jig mounted to a platen plate of the MTS Criterion Model 43 electromechanical test system. The probe, moving at a constant vertical speed of 25 mm/min, pressed perpendicularly downward onto the cup side wall for a total wall deflection distance of 10 mm. Once the desired total wall deflection distance was reached, the resulting resistance force was recorded as the side wall force. The top load compression of the thermoformed cup (ASTM D 2659) was measured by inverting the cup and mechanically pressing downward until collapse failure of the cup resistance was detected. The cup was placed rim downward onto the stationary base plate of the MTS Criterion Model 43 electromechanical test system. A vented base plate was used to allow aft to escape from inside the cup as it was compressed. A top compression plate, moving at a constant rate of 50 mm/min, pressed down on the cup until the collapse was detected. The peak force recorded at collapse was reported as top load.

TABLE 5

Optical properties of 1.9 mm sheet.

| Sample | CaTBP (ppm) | Acid Scavenger | Haze (%) | Clarity (%) | Average Gloss (GU) |
|---|---|---|---|---|---|
| 2A | — | — | 94.5 | 12.6 | 70 |
| 2B | 268 | 134 ppm ZnSt | 62.3 | 96.6 | 89 |
| 2C | 268 | 134 ppm CaSt | 65.6 | 96.9 | 88 |
| 2D | 100 | 50 ppm ZnSt | 87.3 | 95.3 | 83 |
| 2E | 500 | 250 ppm ZnSt | 63.3 | 97.2 | 88 |
| 2F | 800 | 400 ppm ZnSt | 59.8 | 97.9 | 89 |

TABLE 6

Physical properties of 1.9 mm sheet.

| Sample | CaTBP (ppm) | Acid Scavenger | MD Flex Modulus (MPa) | TD Flex Modulus (MPa) | $T_c$ (° C.) | $T_{1/2}$ (min) |
|---|---|---|---|---|---|---|
| 2A | — | — | 1470 | 1450 | 115 | 8.2 |
| 2B | 268 | 134 ppm ZnSt | 1560 | 1540 | 120 | — |
| 2C | 268 | 134 ppm CaSt | 1540 | 1540 | 120 | — |
| 2D | 100 | 50 ppm ZnSt | 1540 | 1520 | 125 | 1.2 |
| 2E | 500 | 250 ppm ZnSt | 1600 | 1580 | 123 | 1.8 |
| 2F | 800 | 400 ppm ZnSt | 1600 | 1560 | 123 | 2.0 |

TABLE 7

Optical Properties of thermoformed drink cups.

| Sample | CaTBP (ppm) | Acid Scavenger | Haze (%) | Clarity (%) | Average Gloss (GU) |
|---|---|---|---|---|---|
| 2A | — | — | 6.7 | 82.4 | 55 |
| 2B | 268 | 134 ppm ZnSt | 2.3 | 98.0 | 110 |
| 2C | 268 | 134 ppm CaSt | 2.6 | 98.2 | 107 |
| 2D | 100 | 50 ppm ZnSt | 2.1 | 99.0 | 112 |
| 2E | 500 | 250 ppm ZnSt | 2.1 | 98.8 | 109 |
| 2F | 800 | 400 ppm ZnSt | 2.4 | 98.6 | 106 |

TABLE 8

Physical properties of thermoformed drink cups.

| Sample | CaTBP (ppm) | Acid Scavenger | Ovality (mil) | Rim Shrinkage (mil) | Side Wall (N) | Top load (N) |
|---|---|---|---|---|---|---|
| 2A | — | — | 5.1 | 74.7 | 4.7 | 257 |
| 2B | 268 | 134 ppm ZnSt | 0.8 | 68.0 | 4.3 | 240 |
| 2C | 268 | 134 ppm CaSt | 1.5 | 68.0 | 4.3 | 250 |
| 2D | 100 | 50 ppm ZnSt | 2.9 | 71.1 | 4.3 | 241 |
| 2E | 500 | 250 ppm ZnSt | 1.9 | 68.3 | 4.3 | 238 |
| 2F | 800 | 400 ppm ZnSt | 2.1 | 68.1 | 4.1 | 233 |

As can be seen from the data in Tables 5-8, the calcium t-butylphosphonate monohydrate ("CaTBP") was effective at nucleating the 3371 resin even at loadings as low as 100 ppm. While some physical properties of the drink cups (e.g., side wall and top load) made from the nucleated resin did not show consistent improvements at all loading levels as compared to the unnucleated resin, the crystallization temperature, crystallization half-time, flexural modulus, and optical properties were consistently improved in both the sheet and cups at all loadings of the CaTBP. For example, with the addition of as little as 100 ppm of CaTBP, the haze of the extruded sheet dropped by approximately 7 haze units, the clarity increased from a mere 12.6% to over 95%, and the average gloss increased by 13 gloss units. Further, in the thermoformed drink cups, the addition of the CaTBP decreased shrinkage (less rim shrinkage) as compared to the unnucleated resin, and the shrinkage that did occur was more isotropic in nature, as evidenced by the substantially reduced ovality values.

EXAMPLE 3

This example demonstrates the production of polymer compositions according to the invention and certain physical properties of thermoformed articles made with such polymer compositions.

Polymer compositions were made using Polypropylene 3371 resin from TotalEnergies as described in Example 2. Certain polymer compositions were nucleated with calcium t-butylphosphonate monohydrate ("CaTBP"), which was used in conjunction with an acid scavenger, such as zinc stearate ("ZnSt") and calcium stearate ("CaSt"). The amount of CaTBP and acid scavenger used in each polymer composition is noted in the tables below. The 3371 resin and additives were high intensity mixed and melt compounded in the same manner as the polymer compositions in Example 2.

The pelletized polymer compositions were then thermoformed into portion cups using the equipment and same (except as noted below) conditions as used in Example 2. To make the extruded sheet, the sheet line extruder's screw rate was set at approximately 42-45 rpm. The sheet exiting the chill rolls had a thickness of 1.2 mm. The thermoformer was fitting with a different mold to produce portion cups having a base diameter of 78 mm, a top rim diameter of 94 mm, and a height of 54 mm.

Specimens of the extruded sheet and thermoformed portion cups were taken for optical property and physical property testing as described in Example 2. For the thermoformed portion cups, the haze measurements were taken in an area that was 25.4 mm from the cup base and 19 mm from the top rim.

TABLE 9

Optical properties of 1.2 mm sheet.

| Sample | CaTBP (ppm) | Acid Scavenger | Haze (%) | Clarity (%) | Average Gloss (GU) |
|---|---|---|---|---|---|
| 3A | — | — | 90.9 | 9.4 | 76 |
| 3B | 268 | 134 ppm ZnSt | 41.5 | 98.9 | 103 |

TABLE 10

Physical properties of 1.2 mm sheet.

| Sample | CaTBP (ppm) | Acid Scavenger | MD Flex Modulus (MPa) | TD Flex Modulus (MPa) | $T_c$ (° C.) | $T_{1/2}$ (min) |
|---|---|---|---|---|---|---|
| 3A | — | — | 1410 | 1440 | 113 | 12.2 |
| 3B | 268 | 134 ppm ZnSt | 1660 | 1700 | 122 | 2.4 |

TABLE 11

Optical Properties of thermoformed portion cups.

| Sample | CaTBP (ppm) | Acid Scavenger | Haze (%) | Clarity (%) |
|---|---|---|---|---|
| 3A | — | — | 79.1 | 10.2 |
| 3B | 268 | 134 ppm ZnSt | 5.2 | 98.8 |

TABLE 12

Physical properties of thermoformed portion cups.

| Sample | CaTBP (ppm) | Acid Scavenger | Ovality (mil) | Rim Shrinkage (mil) | Top load (N) |
|---|---|---|---|---|---|
| 3A | — | — | 4.2 | 78.7 | 291 |
| 3B | 268 | 134 ppm ZnSt | 1.5 | 74.1 | 318 |

The data from Table 9-12 further confirms that the salt of a branched alkyl phosphonic acid (specifically, calcium t-butylphosphonate monohydrate ("CaTBP")) was effective at nucleating the 3371 resin. The nucleated resin showed consistent improvements in optical and physical properties in both the sheet and the thermoformed portion cups.

EXAMPLE 4

This example demonstrates the production of polymer compositions according to the invention and the improved physical properties exhibited by injection molded articles made from such polymer compositions. Specifically, this example demonstrates the effect of the BET specific surface area on the nucleation performance of the salt of a branched alkyl phosphonic acid.

Seven polymer compositions were produced for the injection molding runs described herein. Sample 4A is unnucleated Pro-fax 6301 polypropylene homopolymer from LyondellBasell. Samples 4B-4G were made from a mixture of Pro-fax 6301, 1,000 ppm of calcium t-butylphosphonate monohydrate ("CaTBP"), 500 ppm of zinc stearate ("ZnSt"), 300 ppm of Irganox® 1010 antioxidant, and 600 ppm of Irgafos® 168 antioxidant. The BET specific surface area of each CaTBP used in Samples 4B-4G is set forth in Table 13 below. The BET specific surface area of the nucleating agent samples was measured in accordance with ISO Standard 9277:2010, which is entitled "Determination of the Specific Surface Area of Solids by Gas Adsorption—BET method," using nitrogen as the adsorbing gas. Samples 4B-4G were separately mixed, melt compounded, and pelletized as described in Example 1.

A portion of each polymer composition was injection molded into ASTM flexural bars in accordance with ASTM D4101-11 using a 40-ton Arburg injection molder. Another portion of each polymer composition was also injection molded into ISO shrinkage plaques in accordance with ISO 294 using a 55-ton Arburg injection molder. Lastly, another portion of each polymer composition was injection molded into plaques measuring 77 mm long, 50 mm wide, and 1.27 mm (50 mil) thick on the 40-ton Arburg injection molder.

Heat deflection temperature (HDT) was measured in accordance with ASTM D 648-07 (using 0.4555 MPa stress) on the injection molded ASTM flexural bars described above. Notched Izod impact was measured in accordance with ASTM D 256-10 on an Instron 9050 pendulum impact tester using injection molded ASTM flexural bars that had been trimmed and notched as specified in ASTM D 256-10. Thermal properties of the specimens were measured by differential scanning calorimetry using a Mettler Toledo differential scanning calorimeter (DSC) unit (DSC 3+ STAR system) and analyzed by Mettler STARe evaluation software as described in Example 2, except the specimens were held at a temperature of 140° C. during the test.

Flexural modulus was measured in accordance with ASTM D790-10 using a Criterion Model 43 electromechanical test system from MTS equipped with a three-point bend flexure set-up (Model 642.01A). The flexural bars were conditioned for at least 40 hours at approximately 23° C. and approximately 50% relative humidity prior to testing. The bi-directional flexural modulus (in machine direction (MD) and transverse direction (TD)) were also measured in accordance with ASTM D790-10. The specimens for bi-directional flexural modulus, which were conditioned as described above, were trimmed from injection molded ISO shrinkage plaques. For the MD measurement, 9.2 mm of material was trimmed from the TD axis (leaving 50.8 mm [2 inches] in the TD direction) and the load was applied perpendicular to the flow direction. For the TD measurement, 9.2 mm of material was trimmed from the MD axis (leaving 50.8 mm [2 inches] in the MD direction) and the load was applied parallel to the flow direction.

Shrinkage of the injection molded ISO shrinkage plaques was measured in accordance with ISO 294 on plaques that had been conditioned for at least 48 hours at approximately 23° C. and approximately 50% relative humidity prior to testing. Shrinkage in the machine direction and transverse direction were calculated using the following equations:

$$MD\ \% = \frac{MD_{mold} - MD_{specimen}}{MD_{mold}} \times 100\%$$

$$TD\ \% = \frac{TD_{mold} - TD_{specimen}}{TD_{mold}} \times 100\%$$

In the equations, $MD_{mold}$ is the dimension of the mold in the machine direction, $MD_{specimen}$ is the dimension of the specimen in the machine direction, $TD_{mold}$ is the dimension of the mold in the transverse direction, and $TD_{specimen}$ is the dimension of the specimen in the transverse direction. The isotropy index, which is a measure of how uniformly a part has shrunk, was calculated by dividing the machine direction shrinkage by the transverse direction shrinkage $$\text{Isotropy index} = \frac{MD\ \%}{TD\ \%}.$$

The results of the measurements described above are set forth in Tables 13, 14, and 15 below.

TABLE 13

BET specific surface area of the CaTBP used in Samples 4B-4G.

| Sample | BET Specific Surface Area ($m^2/g$) |
|---|---|
| 4B | 23.58 |
| 4C | 32.69 |
| 4D | 39.06 |
| 4E | 42.17 |
| 4F | 46.64 |
| 4G | 58.74 |

TABLE 14

Thermal and select physical properties of Samples 4A-4G.

| Sample | $T_c$ (° C.) | $T_{1/2}$ (min) | Flex Modulus (MPa) | HDT (° C.) | Notched Izod Impact (J/m) |
|---|---|---|---|---|---|
| 4A | 114 | >30 | 1350 | 87 | 32 |
| 4B | 123 | 5.2 | 1690 | 107 | 51 |
| 4C | 123 | 8.4 | 1680 | 104 | 49 |
| 4D | 123 | 9.2 | 1680 | 105 | 51 |
| 4E | 122 | 6.9 | 1680 | 107 | 50 |
| 4F | 121 | 10.7 | 1680 | 104 | 48 |
| 4G | 122 | 9.9 | 1680 | 105 | 48 |

TABLE 15

Select physical properties of Samples 4A-4G.

| Sample | MD Flex Modulus (MPa) | TD Flex Modulus (MPa) | MD Shrinkage (%) | TD Shrinkage (%) | Isotropy |
|---|---|---|---|---|---|
| 4A | 1330 | 1360 | 1.08 | 1.18 | 0.91 |
| 4B | 1790 | 1780 | 1.14 | 1.15 | 0.99 |

TABLE 15-continued

Select physical properties of Samples 4A-4G.

| Sample | MD Flex Modulus (MPa) | TD Flex Modulus (MPa) | MD Shrinkage (%) | TD Shrinkage (%) | Isotropy |
|---|---|---|---|---|---|
| 4C | 1760 | 1760 | 1.14 | 1.17 | 0.97 |
| 4D | 1760 | 1780 | 1.15 | 1.19 | 0.97 |
| 4E | 1750 | 1760 | 1.17 | 1.20 | 0.97 |
| 4F | 1760 | 1770 | 1.19 | 1.24 | 0.96 |
| 4G | 1740 | 1750 | 1.19 | 1.24 | 0.96 |

The data in Tables 14 and 15 further confirms that the salt of a branched alkyl phosphonic acid (specifically, calcium t-butylphosphonate monohydrate ("CaTBP")) was effective at nucleating a polypropylene polymer, specifically the 6301 resin. For example, the crystallization temperature of all the nucleated samples was at least 7° C. higher than the unnucleated control. Further, the crystallization half-times for the nucleated samples were all below 11 minutes, which is much faster than the unnucleated resin. Faster crystallization rates (lower crystallization half-times) were generally observed for the polymer compositions nucleated with CaTBP having lower BET specific surface areas.

The data in Table 14 also demonstrate the substantial improvement in physical properties that can be achieved via nucleation with the salt of alkyl phosphonic acid (specifically, calcium t-butylphosphonate monohydrate ("CaTBP")). All of the nucleated samples showed an increase in flexural modulus of over 300 MPa as compared to the unnucleated polymer. Further, the heat deflection temperatures of the nucleated resins were all at least 17° C. higher than the heat deflection temperature of the unnucleated polymer. The impact strength of the nucleated polymers was at least 16 J/m higher than the impact strength of the unnucleated polymer.

The data in Table 15 tells the same story. Indeed, the improvements in flexural modulus obtained with the nucleated polymer composition were even more apparent when the bi-directional stiffness was measured. In those measurements, the MD and TD flexural modulus both increased by approximately 400 MPa over the values obtained for the unnucleated resin. And while the MD shrinkage of the nucleated resin was slightly higher than the MD shrinkage of the unnucleated resin, the MD and TD shrinkage of each nucleated resin were closer to each other than the MD and TD shrinkage of the unnucleated resin. This resulted in shrinkage of the nucleated resin that was much more isotropic (i.e., the isotropy index was closer to 1) than the shrinkage of the unnucleated resin. With an isotropy index closer to 1, articles made from the nucleated resin would be expected to exhibit less warping/distortion as compared to articles made from the unnucleated resin.

EXAMPLE 5

This example demonstrates the production of polymer compositions according to the invention and certain physical properties of injection molded parts made with such polymer compositions.

Two polymer compositions were produced for the injection molding runs described herein. Sample 5A is unnucleated Prime Polypro J707P polyproypylene block copolymer from Prime Polymer. The reported melt flow rate of the resin is 30 g/10 min at 230° C. The Polypro J707P is an antistatic impact copolymer exhibiting high impact and rigidity. Sample 5B was made from a mixture of Polypro J707P, 1,000 ppm of calcium t-butylphosphonate monohydrate ("CaTBP"), 500 ppm of zinc stearate ("ZnSt"), 500 ppm of Irganox® 1010 antioxidant, and 1,000 ppm of Irgafos® 168 antioxidant. Sample 5B was mixed, melt compounded, and pelletized as described in Example 1.

Portions of Samples 5A and 5B were injection molded into ASTM flexural bars and ISO shrinkage plaques as described in Example 4. The resulting bars were then used to measure thermal properties, flexural modulus, bi-directional flexural modulus, heat deflection temperature, notched izod impact, shrinkage, and isotropy as described in Example 4. The results of these measurements are set forth in Tables 16 and 17 below.

TABLE 16

Select thermal and physical properties of Samples 5A and 5B.

| Sample | $T_c$ (° C.) | $T_{1/2}$ (min) | Flex Modulus (MPa) | HDT (° C.) | Notched Izod Impact (J/m) |
|---|---|---|---|---|---|
| 4A | 115 | >30 | 1200 | 90 | 78 |
| 4B | 123 | 4.9 | 1430 | 108 | 80 |

TABLE 17

Select physical properties of Samples 5A and 5B.

| Sample | MD Flex Modulus (MPa) | TD Flex Modulus (MPa) | MD Shrinkage (%) | TD Shrinkage (%) | Isotropy |
|---|---|---|---|---|---|
| 5A | 1180 | 1210 | 1.05 | 1.14 | 0.92 |
| 5B | 1560 | 1510 | 1.12 | 1.15 | 0.97 |

The data in Tables 16 and 17 demonstrate that the salt of a branched alkyl phosphonic acid (specifically, calcium t-butylphosphonate monohydrate ("CaTBP")) was effective at nucleating a polypropylene impact copolymer, such as the Polypro J707P resin. These nucleation effects are evident from the increased crystallization temperature, the dramatically shorter crystallization half-time, the higher flexural modulus, and the higher heat deflection temperature. The improvements in flexural modulus obtained with the nucleated polymer composition were again even more apparent when the bi-directional stiffness was measured. In those measurements, the flexural modulus increased by 300-380 MPa. And while the shrinkage of the nucleated resin was slightly higher than that of the unnucleated resin, the isotropy index was much closer to 1, which means that articles made from the nucleated resin are less likely to exhibit warping/distortion as compared to articles made from the unnucleated resin.

EXAMPLE 6

This example demonstrates the production of polymer compositions according to the invention and certain physical properties of injection molded parts made with such polymer compositions.

Two polymer compositions were produced for the injection molding runs described herein. Sample 6A is SA 849S from LyondellBasell. The reported melt flow rate of the resin is 11 g/10 min at 230° C. The SA 849S is a polypropylene random copolymer. Sample 6B was made from a mixture of SA 849S, 1,000 ppm of calcium t-butylphosphonate monohydrate ("CaTBP"), 500 ppm of zinc stearate ("ZnSt"), 500 ppm of Irganox® 1010 antioxidant, and 1,000 ppm of Irgafos® 168 antioxidant. Sample 6B was mixed, melt compounded, and pelletized as described in Example 1.

Portions of Samples 6A and 6B were injection molded into 1.27 mm (50 mil) plaques as described in Example 4 above. The resulting plaques were then used to measure flexural modulus as described in Example 4. Haze and clarity were measured on the 50 mil plaques as described previously.

TABLE 18

Optical and physical properties of Samples 6A and 6B.

| Sample | Haze (%) | Clarity (%) | Flex Modulus (MPa) |
|---|---|---|---|
| 6A | 46.5 | 93.1 | 1200 |
| 6B | 20.7 | 99.7 | 1310 |

The data in Table 18 demonstrate that the salt of a branched alkyl phosphonic acid (specifically, calcium t-butylphosphonate monohydrate ("CaTBP")) was effective at nucleating a polypropylene random copolymer, such as the SA 849S resin. The haze of the nucleated resin was less than half the haze of the unnucleated resin. The clarity of the nucleated resin also increased as compared to the unnucleated resin. Lastly, the flexural modulus of the nucleated resin was over 100 MPa higher than the flexural modulus of the unnucleated resin.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A polymer composition comprising:
   (a) a polypropylene polymer; and
   (b) a salt of a branched alkyl phosphonic acid,
   wherein the salt of the branched alkyl phosphonic acid has a BET specific surface area of 20 m$^2$/g or more.

2. The polymer composition of claim 1, wherein the polypropylene polymer is selected from the group consisting of polypropylene homopolymers, polypropylene random copolymers, polypropylene impact copolymers, and mixtures thereof.

3. The polymer composition of claim 2, wherein the polypropylene polymer is selected from the group consisting of polypropylene homopolymers, polypropylene random copolymers, and mixtures thereof.

4. The polymer composition of claim 1, wherein the salt of the branched alkyl phosphonic acid comprises one or more cations selected from the group consisting of Group 1 element cations, Group 2 element cations, and Group 12 element cations.

5. The polymer composition of claim 4, wherein the salt of the branched alkyl phosphonic acid comprises a Group 2 element cation.

6. The polymer composition of claim 5, wherein the salt of the branched alkyl phosphonic acid comprises a calcium cation.

7. The polymer composition of claim 1, wherein the branched alkyl phosphonic acid comprises a branched alkyl group selected from the group consisting of isopropyl, sec-butyl, isobutyl, tert-butyl, tert-pentyl, neopentyl, isopentyl, sec-pentyl, sec-isopentyl, pentan-3-yl, and 2-methylbutyl.

8. The polymer composition of claim 1, wherein the branched alkyl phosphonic acid comprises a tertiary alkyl group.

9. The polymer composition of claim 7, wherein the branched alkyl phosphonic acid comprises a branched alkyl group selected from the group consisting of tert-butyl, tert-pentyl, and neopentyl.

10. The polymer composition of claim 1, wherein the salt of the branched alkyl phosphonic acid is a salt of tert-butylphosphonic acid.

11. The polymer composition of claim 10, wherein the salt of the branched alkyl phosphonic acid is the calcium salt of tert-butylphosphonic acid.

12. The polymer composition of claim 1, wherein the salt of the branched alkyl phosphonic acid has a BET specific surface area of 30 m$^2$/g or more.

13. The polymer composition of claim 1, wherein the salt of the branched alkyl phosphonic acid is present in the polymer composition in an amount of about 50 parts-per-million to about 5,000 parts-per-million, based on the total weight of the polymer composition.

14. The polymer composition of claim 1, wherein the salt of the branched alkyl phosphonic acid is present in the polymer composition in an amount of about 2 wt. % to about 20 wt. %, based on the total weight of the polymer composition.

15. The polymer composition of claim 1, wherein the polymer composition further comprises an acid scavenger.

16. The polymer composition of claim 15, wherein the acid scavenger is selected from the group consisting of metal salts of fatty acids, synthetic hydrotalcites, and mixtures thereof.

17. The polymer composition of claim 16, wherein the acid scavenger is a salt of stearic acid.

18. The polymer composition of claim 17, wherein the acid scavenger is selected from the group consisting of calcium stearate, zinc stearate, and mixtures thereof.

19. The polymer composition of claim 16, wherein the acid scavenger is a synthetic hydrotalcite.

20. The polymer composition of claim 15, wherein the salt of the branch alkyl phosphonic acid and the acid scavenger are present in a ratio of about 4:1 to about 1:4, based on the weight of the salt of the branched alkyl phosphonic acid and the acid scavenger in the polymer composition.

* * * * *